Jan. 19, 1932.  F. D. VAN GILDER  1,842,133
INDICATOR FOR SIGNAL LIGHTS IN AUTOMOBILES AND SIMILAR VEHICLES
Filed Dec. 22, 1927
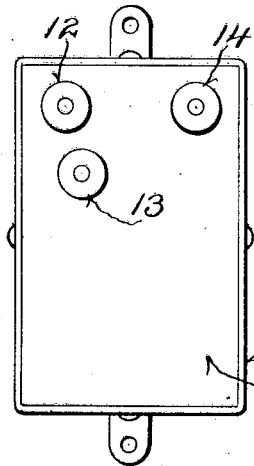
Fig. 1.
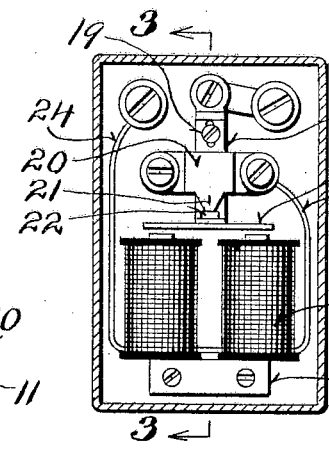
Fig. 2.
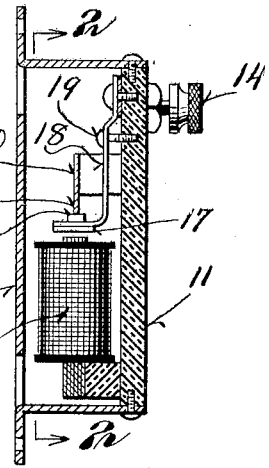
Fig. 3.
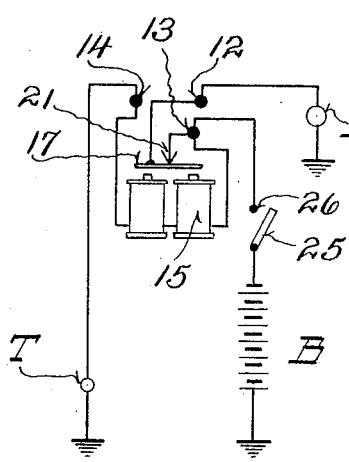
Fig. 4.
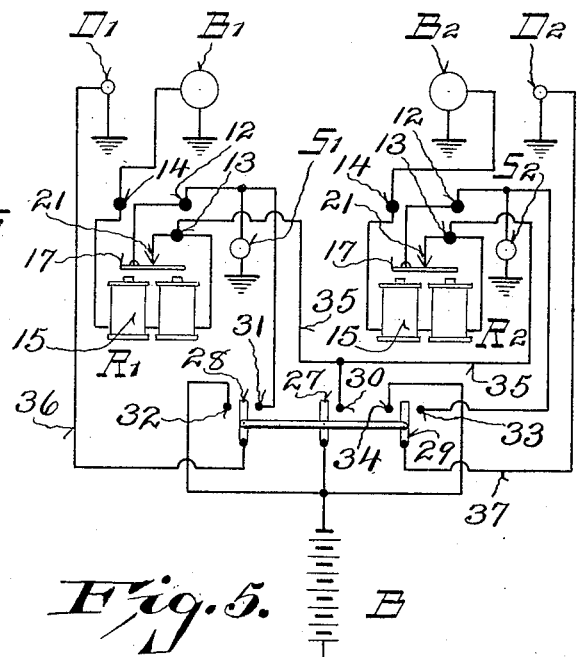
Fig. 5.
Inventor
F. D. Van Gilder Patented Jan. 19, 1932

1,842,133

UNITED STATES PATENT OFFICE

FLOYD D. VAN GILDER, OF RACINE, WISCONSIN, ASSIGNOR OF ONE-THIRD TO ELBERT O. VAN GILDER, OF RACINE, WISCONSIN

INDICATOR FOR SIGNAL LIGHTS IN AUTOMOBILES AND SIMILAR VEHICLES

Application filed December 22, 1927. Serial No. 241,830.

This invention relates to an indicator and a system used therewith for signal lights in automobiles and similar vehicles.

Objects of this invention are to provide a novel form of indicator signal for the lamps of an automobile which is so constructed that it will light a signal lamp or tell-tale lamp on the dash board whenever any of the main lights of the automobile have burned out so as to apprise the driver of the status of his lights.

Further objects are to provide a novel system whereby the bright headlights are connected through the signal device to the signal lamp, and in which the apparatus will throw in the dim front lights or headlights and also light the signal light whenever one of the bright lights burns out.

Further objects are to provide a simple system adapted for easy control by means of switches operated by the driver in the usual manner so that no thought is required on the part of the operator for the operation of this device.

A further object of this invention is to provide a novel form of control relay or electromagnetic which is wholly automatic in its action, which is of small size, and which may be readily manufactured and attached to any desirable portion of the automobile.

Embodiments of the invention are shown in the accompanying drawings in which:—

Figure 1 is a front view of the relay;

Figure 2 is a sectional view on the line 2—2 of Figure 3 through the relay;

Figure 3 is a sectional view on the line 3—3 of Figure 2;

Figure 4 is a diagrammatic view showing the wiring for the taillight when associated with the relay;

Figure 5 is a diagrammatic view showing the wiring for the bright and dim headlights and the associated relays.

Referring to the drawings, it will be seen particularly from Figures 1, 2, and 3, that the relay comprises a casing 10 which may, if desired, be formed of sheet metal and which has a removable front or cover 11 held in place in any suitable manner. This cover carries three binding posts 12, 13 and 14, connected as hereinafter described to the parts of the relay.

The relay comprises a pair of electromagnets 15 secured by means of their yoke 16 to the cover plate 11, as indicated in Figures 2 and 3, and provided with an armature 17 normally held away from the poles of the magnet, as shown. This armature is carried by a spring strip 18 which is slotted and which is adjusted by means of the screw 19 (see Figures 2 and 3). The spring strip is connected to the binding post 14 as indicated.

Further, it is to be noted that the relay is provided with a bridge piece 20 which is connected to the binding post 13 and which is provided with a point or stationary contact 21 adapted to contact with the movable contact 22 of the armature when the parts are in the position shown. Preferably, these points are formed of platinum or other non-corroding contact material.

One end of the coils 15 is connected by means of the conductor 23 with the bridge piece 20, and consequently with the binding post 13. The other end of the coils is connected by means of conductor 24 to the binding post 12.

In using this device for the taillight, it is to be noted that one side of the taillight T, is grounded and the other side connected to the binding post 14. The binding post 12 is connected to a small signal light S, mounted on the dash board, and the other side of the signal lamp is grounded, as shown in Figure 4. The battery B has one side grounded as in the usual practice and its other side is connected to the switch 25; such switch is manually closed and adapted to contact with the stationary contact 26. This contact is connected to the binding post 13, as shown.

The operation of this apparatus is as follows:

Assume that the switch 25 is closed. Current passes from the battery through the coils 15 to the taillight and consequently the armature 17 is held away from its stationary contact. However, if the taillight should burn out the circuit through the coils 15 is opened and the armature flies back into the position shown in Figure 4, thus closing the auxiliary circuit through the signal lamp or taillight S on the dash, and thus apprising the operator of the fact that the taillight is burned out.

In the form shown in Figure 5, two of these relays are employed. One relay, indicated generally by the reference character $R_1$ is connected with the bright and dim headlights $B_1$ and $D_1$ and the signal lamp $S_1$. The other relay, indicated generally by the reference character $R_2$ is connected with the other set of lights, namely, the bright lights $B_2$, the dim lights $D_2$, and the signal lights $S_2$.

A single control switch is employed and this switch may take any of several forms. In the form shown, three movable members 27, 28, and 29, are employed. The member 27 is adapted to engage the stationary contact 30. The member 28 is adapted to engage either the stationary contact 31 or the stationary contact 32. The member 29 is adapted to engage either the stationary contact 33 or the stationary contact 34. The contacts 32 and 34 and the member 27 are connected to one side of the battery B, the other side being grounded as indicated.

From the contact 30, a conductor 35 leads to the binding post 13 of the relay $R_2$ and a conductor 35 leads to the binding post 12 of the relay $R_1$. The binding post 14 of the relay $R_1$ is connected through the bright light $B_1$ to the ground. The binding post 14 of the relay $R_2$ is connected through the bright light $B_2$ to the ground. The contact 31 is connected to the binding post 12 of the relay $R_1$ and the contact 33 is connected to the binding post 12 of the relay $R_2$. The member 28 is connected by means of conductor 36 through the dim light $D_1$ to the ground. The member 29 is connected through conductor 37 through the dim light $D_2$ to the ground.

Assume that it is desired to light the bright light. Under these conditions, the operator moves the switch to the light which simultaneously closes the battery circuit through each of the coils of the relays $R_1$ and $R_2$ and through the bright lights $B_1$ and $B_2$ to the ground. Further than this, the switch arms 28 and 29 engage the contacts 31 and 33, respectively, and thus connect the dim lights $D_1$ and $D_2$ with the armatures of the relays $R_1$ and $R_2$, as is apparent from Figure 5. Assume now that one of the bright lights burns out, for instance, the bright light $B_1$. Under these conditions, the relay $R_1$ is de-energized and the signal lamp $S_1$ is lighted, as the armature contacts with the stationary contact 21.

Further than this, an auxiliary circuit is established from binding post 12 which is connected now to the battery to the contact 31, through the switch member 28 to the dim light $D_1$. Thus, the dim light associated with the burned out bright light is illuminated and also the correct signal lamp $S_1$ is lighted. This conforms to the requirements for lights and also apprises the driver of the fact that the left hand bright light has burned out. Obviously, the operation is identically the same for the right hand set of lights, as viewed in Figure 5. This directly connects the battery through the dim lights $D_1$ and $D_2$ to the ground and thus no interference is produced with the ordinary operation of the lights.

It will be seen that a novel form of indicator for automobile lights has been provided which is easy to install, which is of simple construction, and which automatically apprises the driver of the condition of his lights.

Although the invention has been described in considerable detail, such description is intended as illustrative rather than limiting as the invention may be variously embodied and as the scope of such invention is to be determined as claimed.

I claim:

A switch of the class described including a supporting panel, spaced magnets carried thereby, a spring strip adjustably mounted upon the panel and having a lateral armature normally spaced from the magnets, means for connecting one end of the strip to a binding post, a bridge piece transversely of the strip having one end connected to a binding post and the other end connected to one end of the windings of the magnets, a stationary contact carried by the bridge piece, a movable contact carried by the armature and normally engaging the stationary contact, and means for connecting the other end of the windings of the magnets to a third binding post.

In testimony that I claim the foregoing I have hereunto set my hand at Racine, in the county of Racine and State of Wisconsin.

FLOYD D. VAN GILDER.